United States Patent
Schmid et al.

(10) Patent No.: US 7,085,928 B1
(45) Date of Patent: Aug. 1, 2006

(54) SYSTEM AND METHOD FOR DEFENDING AGAINST MALICIOUS SOFTWARE

(75) Inventors: Matthew N. Schmid, Reston, VA (US); John Thomas Bloch, Washington, DC (US); Frank F. Hill, Falls Church, VA (US); Anup K. Ghosh, Fairfax, VA (US)

(73) Assignee: Cigital, Dulles, VA (US)

( * ) Notice: Subject to any disclaimer, the term of this patent is extended or adjusted under 35 U.S.C. 154(b) by 826 days.

(21) Appl. No.: 09/821,754

(22) Filed: Mar. 30, 2001

Related U.S. Application Data

(60) Provisional application No. 60/193,397, filed on Mar. 31, 2000.

(51) Int. Cl.
  *G06F 9/00* (2006.01)
(52) U.S. Cl. ..................................... 713/164
(58) Field of Classification Search ............... 713/200, 713/201, 159, 164
  See application file for complete search history.

(56) References Cited

U.S. PATENT DOCUMENTS

| | | | | |
|---|---|---|---|---|
| 5,987,611 A | * | 11/1999 | Freund | 713/201 |
| 6,092,194 A | * | 7/2000 | Touboul | 713/200 |
| 6,219,707 B1 | * | 4/2001 | Gooderum et al. | 709/225 |
| 6,298,445 B1 | * | 10/2001 | Shostack et al. | 713/201 |
| 6,658,571 B1 | * | 12/2003 | O'Brien et al. | 713/200 |
| 6,684,329 B1 | * | 1/2004 | Epstein et al. | 713/150 |

OTHER PUBLICATIONS

Mitchem, T,; Lu, R; O'Brien, R; Using kernel to secure applications, IEEE Xplore Computer Security Applications Conference, 1997. Proceedingl, 13th Annual Dec. 8-12, 1997 pp.: 175-181.*

Mitchem, T,; Lu, R; O'Brien, R; Larson, R.; Linux kernel loadable wrappers, IEEE Xplore DARPA Information Survivability Conference and Exposition, 2000, DISCEX '0 vol. 2, Jan. 25-27, 2000 pp. 296-307.*

* cited by examiner

*Primary Examiner*—Gilberto Barrón, Jr.
*Assistant Examiner*—Ellen C Tran
(74) *Attorney, Agent, or Firm*—Pillsbury Winthrop Shaw Pittman LLP

(57) ABSTRACT

An execution management utility designed to prevent software from executing without the prior approval of system administrative or other security staff. For example, the present invention can assist corporations by enforcing policies regarding unauthorized, unlicensed, or pirated software, such as, but not limited to, games; entertainment software; and non-standard utilities, such as advertising-enhanced browsers. A Windows NT based system is disclosed in which a kernel module selectively intercepts process creation requests.

16 Claims, 2 Drawing Sheets

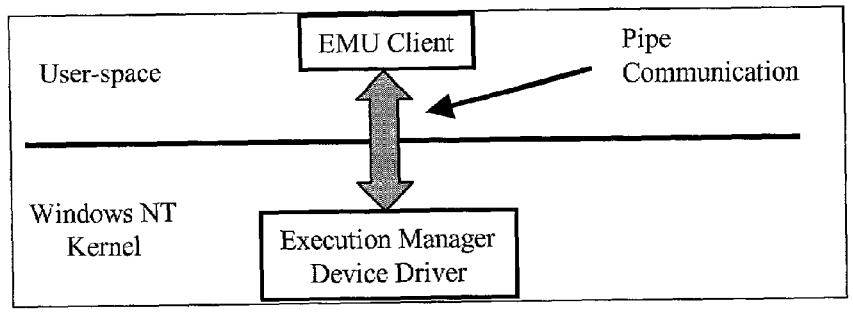

FIG. 1

```
[Device Driver 1: installs wrapper]
    dd1_old = services[ CREATE_PROCESS_INDEX ];
    services[ CREATE_PROCESS_INDEX ] = dd1_new;

[Device Driver 2: installs wrapper]
    dd2_old = services[ CREATE_PROCESS_INDEX ];
    services[ CREATE_PROCESS_INDEX ] = dd2_new;

[Device Driver 1: removes wrapper]
    services[ CREATE_PROCESS_INDEX ] = dd1_old;

Notice that services[CREATE_PROCESS_INDEX] now contains its original value (that of the real System
Service). Device Driver 2 has been unwrapped without its knowledge!
```

FIG. 2

SYSTEM AND METHOD FOR DEFENDING AGAINST MALICIOUS SOFTWARE

This application claims the benefit of U.S. Provisional Application No. 60/193,397, filed Mar. 31, 2000.

BACKGROUND

1. Field of the Invention

The present invention relates to the field of computer security, and more specifically relates to controlling the software which may be run on a computer.

2. Background of the Invention

The distribution of malicious software has plagued computer networks since the days of electronic bulletin board systems (BBSs). While these publicly accessible sites allowed users to exchange software, it was well understood that untrusted software could be malicious. As a rule of thumb software downloaded from a BBS was not installed on essential computer systems unless it was somehow determined to be safe.

Today the Internet dominates computing, and because connectivity and interoperability are essential systemic qualities, malicious software has become an even more pernicious problem. Web sites provide mobile code, such as ActiveX controls and signed Java applets, which can be seamlessly, and often transparently, installed on a computer and executed through a common Web browser. While such software may enhance the multimedia experience, create a more interactive environment, or provide other positive benefits, the same technology allows software to be written which locates and destroys documents. Documents accessible to such software include not only those stored on the computer on which the software is installed, but also those available across the network to which the computer belongs.

In addition to Web browser based malicious software, users also run programs received via E-mail for entertainment, without knowing what the program will do, or its origin in the world. Other executables can masquerade as data, donning, for example, DOC, GIF, and JPEG file extensions, and causing their own type of damage.

A study by Computer Economics of Carlsbad, Calif., found that in the first two quarters of 1999 alone, businesses worldwide lost more than $7.6 billion to malicious software. Additionally, well-publicized events involving the Melissa virus, the Explorer.zip worm, and BackOrifice clients contribute to an atmosphere of crisis. Organizations may respond to these threats by adopting policies prohibiting software download or installation, but, in practice, organizations have little control over this activity.

The idea of restricting application execution has been explored by some in the prior art, but none adequately addresses issues of strong security and easy administration. Some in the prior art allow administrators to set up rules for local computers, which define times during which programs can be executed, and by whom such programs may be executed. In addition, the prior art has introduced the concept of rejecting unknown applications.

However, those in the prior art have several weaknesses which render them inadequate. For example, those rejecting unknown applications base the determination of which applications are known solely on the application's executable name. This system allows even a novice user to bypass the security system by naming a malicious application after an approved one. In addition, many in the prior art provide inadequate administrative support over a user community. For example, the prior art only allows administration on a per-machine basis, and policies must be defined explicitly for each user.

Others in the prior art have taken a different approach to control of executable software. In those products, cryptographic hashes of critical files are maintained and periodically verified. An application on the computer periodically checks the critical files, and if changes are detected, an administrator may be notified. This technology is used primarily for intrusion detection. However, execution control is not combined with error checking, thus an executable that has been compromised by a virus (and has therefore had its signature altered) will be allowed to execute until the system has detected this change and an administrator has removed the compromised executable. A significant amount of damage could be done before the problem is detected.

SUMMARY OF THE INVENTION

The present invention improves upon prior malicious software protection applications by not only resolving the problems discussed above, but also by addressing emerging dangers and unknown attacks. The present invention includes an execution management utility designed to prevent software from executing without the prior approval of system administrative staff. In a preferred embodiment, a kernel module, loaded by Windows NT systems, may be capable of selectively intercepting process creation requests.

Although the present invention is inspired by malicious software, the present invention also addresses other problems. For example, the present invention can assist corporations by enforcing policies regarding unauthorized, unlicensed, or pirated software, such as, but not limited to, games; entertainment software; and non-standard utilities, such as advertising-enhanced browsers.

BRIEF DESCRIPTION OF THE DRAWINGS

FIG. 1 is a block diagram illustrating communication between an EMU Client, operating in user-space, and an Execution Manager, functioning as a device driver in kernel-space.

FIG. 2 is a flow diagram illustrating a method through which a device driver may be unwrapped without warning.

DETAILED DESCRIPTION OF THE INVENTION

Figure 3:
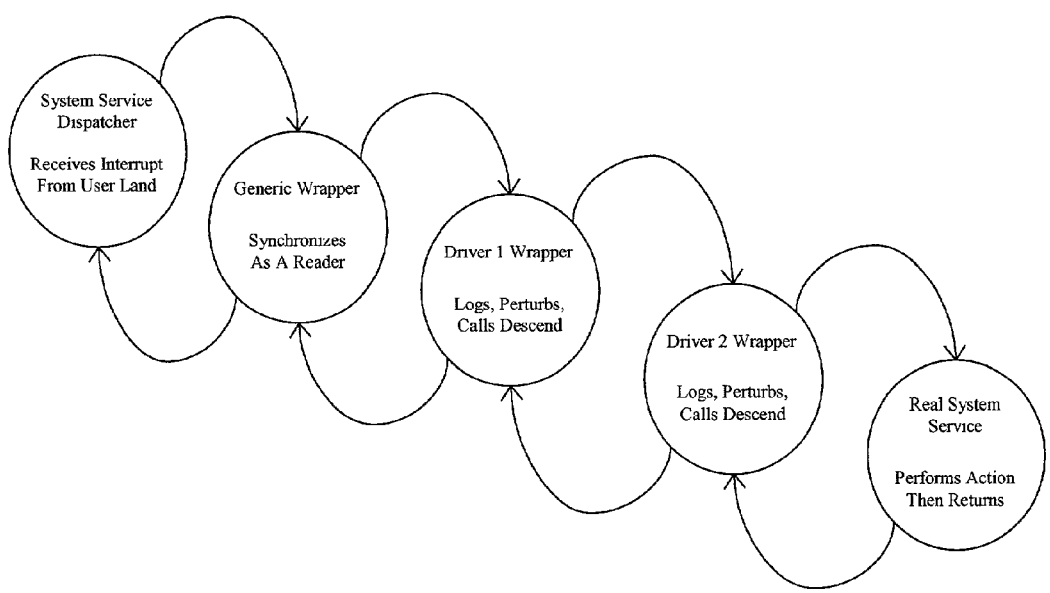
FIG. 3 is a block diagram illustrating a kernel-level wrapping technique.

The present invention improves upon existing executable control software, and provides administrators with a valuable defense against the introduction of hostile or unknown code. The present invention is comprised of an execution management utility (EMU), which restricts a user to executing only an approved and known set of applications. Such applications typically include application-specific operating system software, operating system services, and a set of applications necessary for a user to perform his or her duties. In addition, an EMU provides a client-server architecture that enables an administrator to restrict applications available to individual users working on a workstation with an EMU client installed. This allows administrators to address specific user software needs.

To properly implement a security system based on an EMU, an "EMU client" may be required. An EMU client may comprise a service, or other operating system level component, that runs on each protected computer. Some operating systems provide security necessary to ensure that the service will run, and that only an administrative user can shut it down.

At the core of an EMU is an Execution Control List, or ECL. In a preferred embodiment, each user on the system has his or her own ECL. Each ECL may contain a table of applications a user is authorized to run and corresponding cryptographic codes that uniquely identify each application. In a preferred embodiment, the present invention utilizes the MD5 cryptographic algorithm, as defined in Internet RFC 1321, to create the cryptographic identifier, or "hash."

Identifying a program through its hash reduces the likelihood that a user can bypass the EMU simply by changing the name of an unknown executable to the name of an executable that is already part of an ECL. In addition, identifying a program through its hash may reduce the potential impact of viruses; many viruses propagate by silently attaching themselves to an application and executing whenever the application is run.

Using hashes for identification has the additional benefit of preventing modified applications from executing. An EMU may ensure that modified executables will not run, effectively protecting a system from any damage these altered applications could cause.

An EMU client may intercept execution requests and verify whether a requesting user has permission to run a requested application. In a preferred embodiment, an EMU client may verify an execution request by creating an MD5 cryptographic hash of a requested executable, and then looking for this name/hash combination in a user ECL. In this embodiment, a name is used in addition to the hash to ensure that a user is executing the program he or she intended to execute. For example, the name/hash verification would prevent an attack in which a program that deletes files is accidentally renamed to that of one that compresses files for archival (assuming that both of these are in the user's ECL). If a name/hash combination were not used, execution of the aforementioned program would result in the deletion of files.

In one contemplated embodiment, the present invention may utilize locally stored and locally maintained ECL's. However, in this embodiment, each EMU client would be required to maintain a copy of all ECL's for every user on the system. Without such copies, users would not be able to easily move from computer to computer and have their ECL's follow them. In a preferred embodiment, user mobility may be facilitated through an Administrative Server ("AS").

An AS may facilitate user mobility by storing master copies of all ECL's in a common location, from which an EMU client may download an appropriate ECL when a new user accesses the computer. In addition to ECL's for each user, an AS may contain a default ECL which may be locally cached by an EMU client. A default ECL may be used when an EMU client does not have an ECL for a requesting user and cannot obtain an ECL for a user from an AS. Providing a default ECL allows a user authorized to log onto an EMU-protected workstation to be provided with a basic, pre-approved ECL.

To make itself useful on an enterprise level, an AS may also provide an interface by which all administrable EMU clients may be accessed through a centralized location. An administrator can manage policies and control EMU client functionality from a single machine running as an EMU client's AS. An administrator may also control ECL distribution to EMU clients through an AS.

For example, an AS may allow an administrator to send a command to a specific EMU client, or a group of EMU clients, which forces an ECL update. This might be beneficial after an administrator has made changes to an ECL, and wants a client to implement the new ECL.

In addition to server-required updates, an EMU client may request an ECL from an AS under several different circumstances. For example, if an EMU client does not have a local copy of an ECL for a requesting user, an ECL may be requested. In addition, an EMU client may store and refer to a time-stamped local copy of a user's ECL. After an administrator-defined period, an EMU client may request an updated copy of an ECL.

An AS may process user ECL requests and distribute appropriate ECL's to EMU clients via the local area network. Each ECL maintained by an AS contains a hash of ECL contents. When an EMU client receives a user ECL from an AS, ECL signature verification may occur. If a signature is valid (indicating that an ECL originated from an AS and has not been modified), an ECL may be accepted for use by an EMU client. An invalid signature may result in ECL rejection.

In addition to allowing an administrator to monitor and modify ECL's, an AS may also handle user requests to add applications to an ECL. A user can generate such a request when an EMU client rejects execution of an application that is not on a user ECL. When an EMU client prevents an application from executing, an EMU client may generate a dialog box indicating that the requested executable is not on a current ECL, and may ask a user if she would like to request the addition of the requested executable to her ECL. If she opts to submit a request, an ECL Add Request is forwarded to an AS. If an AS is unavailable, an execution request may be rejected.

An add request may consist of a user name, program name, program hash, and other such information. An AS may maintain a queue of add requests awaiting approval or rejection by an administrator. To make an administrator's job easier, an AS may maintain a database of known application hashes. If an add request is received for a known application, an AS may inform an administrator of this positive identification. If a program's hash is unknown, an administrator may investigate the application before allowing its addition to a user ECL. If an administrator chooses to accept an add request, a user ECL is updated and a workstation requesting an ECL change may be signaled to update its ECL.

In addition to user- and EMU client-generated requests, an AS may also allow executables to be added to an ECL through an ECL editor, and through a "learning mode. In a preferred embodiment, an ECL may be developed using an ECL editor. An ECL editor allows an administrator to select executable files to be added to user ECL's. An administrator may also use an ECL editor to modify existing policies. Additionally, an ECL editor may allow an administrator to make changes to groups of policies all at once. This functionality may be useful when, for example, an administrator decides that all users in a group should be able to execute certain applications. However, developing an entire policy using an ECL editor may be time consuming, so an EMU may provide other methods for policy development.

In a preferred embodiment, an EMU client may include a learning mode, which may enable an EMU client to develop an ECL policy customized for individual users. Learning mode can be enabled on either a per-user or per-machine basis. An administrator can enter a password into an EMU client to set a machine in learning mode. A special entry in the user's ECL can also be used to signify that a user is in learning mode. Once in learning mode, an ECL can be generated by observing user application usage patterns. During learning mode, an EMU passively observes program execution and does not attempt to enforce any ECL restrictions. Each application that a user executes may be added to his or her current ECL.

Developing custom policies through learning mode enables an administrator to limit a user to those programs necessary and sufficient to perform his or her job. These functions may include operating system utilities and services that start up on machine boot. After allowing a user to work under learning mode for a specified period of time, an administrator may review a generated ECL and make any desired changes.

A process-based tracing facility may provide all of the above described features. However, in the presently preferred Windows NT embodiment, there are several locations where a process-based tracing facility can be implemented. In the user space, a process tracing facility can be implemented between Windows applications and the Win32 subsystem. This is the location where most Windows wrappers are implemented. The benefit of this approach is that all code can be written in user mode and the kernel need not be modified. The drawback of this approach, which renders it infeasible for protection from malicious software, is that it is easily bypassed by making direct calls to the operating system.

While most well-behaved Windows applications make system calls through the Win32 API, it is also possible to bypass this interface by making calls directly to kernel services. Nothing in the Windows NT kernel prevents making direct calls to executive objects. A malicious program cognizant of Windows wrapping approaches may attempt to bypass a wrapper implemented between Windows and the Win32 subsystem by making direct calls to operating system objects, rather than through the Win32 API.

To provide proper integration with an operating system, the present invention utilizes an kernel-level wrapping approach to executable control. To implement a non-bypassable kernel wrapper, implementation should take place within the kernel. Installing a device driver is a method for adding user-written kernel-mode code to the operating system kernel. Writing a device driver provides access to internal operating system functions and data structures not accessible from user mode. Device drivers may be installed in an I/O subsystem, and may be used to intercept system service requests.

System services are operations performed by an operating system kernel on behalf of applications or other kernel components. These operations are implemented as system services because they may affect processes other than a calling process. For instance, manipulating CPU hardware, starting and stopping processes, and manipulating files are sensitive operations generally implemented by services at the kernel level.

In a preferred Windows NT embodiment, user applications invoke system services by executing an interrupt instruction. Kernel code temporarily takes control of a computer in response to an interrupt, and often performs some useful activity for a calling process before relinquishing control. A kernel entity, known as a dispatcher, initially responds to an interrupt instruction, determines the nature of an interrupt, and calls a function to handle the request. Two tables in kernel memory describe locations and parameter requirements of all functions available to a dispatcher. One table specifies handlers for user requests; the other specifies handlers for requests originating within the kernel. The calling process places information about the requested system service on the stack along with any parameters required to complete the operation.

The present invention may control new process creation by instructing a dispatcher to call a specific function when a user process invokes certain system services. This approach requires constructing a device driver that may be dynamically loaded into a kernel, or may be loaded as part of a boot sequence. When a device driver loads, it modifies an entry in a table consulted by a dispatcher to handle an interrupt instruction. In the preferred Windows NT embodiment, the modified entry may cause a dispatcher to call an inserted function rather than ZwCreateProcess, the NT function responsible for creating new user- and kernel-mode processes. It is important to note that the driver modifies only tables relevant to requests from user applications. This is because we are not interested in controlling the kernel's ability to create processes. In addition, the inserted wrapper function exposes properties and methods similar to those of ZwCreateProcess, thereby limiting the impact of the kernel wrapper.

When a substitute function is called by a dispatcher, the function determines whether to allow or block process creation. If the substitute function wishes to allow process creation, ZwCreateProcess may be invoked with a user's parameters, and results may be passed to a calling function. If process creation is not allowed, a failure value may be returned. There are several possible ways by which a substitute function may evaluate a creation request.

In a preferred embodiment, a wrapping function may contact a user-mode application to obtain a process creation request ruling. The wrapping function may provide information about requesting and requested processes (i.e. the current process and the process it wishes to create). A user-mode application may engage its own logic, and inform the wrapping function of its decision. This logic may include consulting a list of approved executables, prompting for permission to proceed, or requiring more sophisticated authorization (such as, but not limited to, a password).

Note that once a wrapping function intercepts an execution request, a decision must be made about the fate of the request. As discussed above, a wrapping function contacts a user-mode application running as a service (not to be confused with a system service), provides information about a request, and receives instructions to permit or deny creation of a new process.

A kernel wrapping function may communicate with a user-mode service. An I/O Subsystem may provide a communication mechanism which allows applications to pass messages and data to device drivers. In a preferred embodiment, messages may be represented as control codes, called IOCTLS, and may be passed to device drivers, with or without data, via an API function, such as DeviceIoControl. However, such an API function may not provide an adequate communication channel because of its asymmetric nature. Communication via DeviceIoControl may be initiated by the application; a device driver merely responds to requests.

In a preferred embodiment, a wrapper may notify a service when assistance is needed, instead of waiting for an inquiry from a service. When DeviceIoControl calls or other, similar calls, are paired with synchronization objects, two-way communication between a service and a kernel may be established. Using this approach, a device driver may indicate an interception by releasing a semaphore. This may cause a service thread to resume execution and to call DeviceIoControl, thereby retrieving information about an execution request from a kernel. After a service considers input from a kernel, a service may return a verdict via DeviceIoControl.

Alternative, polling-based embodiments are also contemplated. However, polling-based embodiments have proven less efficient than the embodiment described above. Another embodiment contemplated employed API-level wrapping, rather than kernel-level wrapping, in a effort to simplify communication. However, this API-level wrapping raises a specter of multithreaded, race condition attacks, where one thread applies for and receives permission to execute an innocuous application, such as clock.exe, and another thread replaces clock.exe with something threatening, such as napster.exe. In this example, a data swap may take place after checks on clock.exe is validated but before a call to CreateProcess. This is an example of a time of check versus time of use vulnerability that permits race condition attacks.

From both a security and a programmability perspective, bi-directional communication between device drivers and user-mode applications may be more appealing when details are hidden by a layer of abstraction. As illustrated in FIG. 1, a preferred embodiment of the present invention may employ a general-purpose library which provides communication facilities mimicking pipe or socket communication. Kernel entities and applications may use "accept" and "close" functions to create and destroy connections; "read" and "write" calls extract data from or insert data into the "pipe" abstraction provided by a library. A library may hide data buffering and synchronization details and facilitate rapid development and thorough testing.

Pipe- or socket-like communication may be facilitated by enhancing a kernel-level function by wrapping a more advanced function around the kernel-level function. A simple method of wrapping involves making a local copy of relevant system service entries and placing a wrapper function in place of those service entries. This method also works well when multiple people install wrappers; in effect, a function chain is created, in which a function thinks that it is calling an appropriate System Service. However, as illustrated by FIG. 2, this chain can easily become disrupted if device drivers begin unwrapping system services.

In addition to enhancing communications, it is also desirable for a wrapping function to load and unload dynamically. To achieve this goal, the present invention addresses the difficulties presented when unloading a device driver which has wrapped a system service. Specifically, because a user mode program may call a system service at any time, it can be difficult to tell when a wrapper is in use. A driver may not be unloaded safely until a wrapper is no longer in use.

To perform service wrapping properly, a wrapper should have at least two important features: the ability to allow multiple, concurrent wrappers, and a framework under which drivers can safely wrap and unwrap system services. Although there are several possible solutions to allowing multiple concurrent device drivers, a preferred embodiment exports functionality to the entire kernel. This approach may allow other device drivers to call exported functions that add to, remove from, and descend through layers of functions on top of existing system services. This approach has the added benefit of hiding implementation details, and allowing a wrapper to carefully synchronize access to layers surrounding a system service table.

The synchronization of system service access functions allows the present invention to provide safe wrapping and unwrapping of system services. In a preferred embodiment, actions that add or remove wrapper layers are considered "writers," while actual calls to system services that descend through the layers are considered "readers." Consistent with traditional synchronization problems, multiple readers are allowed to descend through wrapper layers simultaneously, but writer actions, which may modify wrapper layers, should be serialized. As illustrated by FIG. 3, tightly controlling reader and writer synchronization allows a device driver to safely unload after removing all of its system service table layers.

An EMU designed as described above may provide security-conscious administrators with a valuable defense against the introduction of new and potentially malicious code. Such an EMU ensures that only those applications explicitly approved by an administrator may be executed by users. This greatly reduces the threat posed by viruses, Trojan horses, and even malicious insiders. In addition to security considerations, an EMU also provides control over illegally-obtained application distribution and entertainment program use.

As previously described, a preferred EMU embodiment includes numerous features that make it manageable at the enterprise level, including centrally-managed execution control lists and client-server communication. A kernel based wrapping approach ensures the non-bypassability of an EMU and may result in negligible performance overhead. Security features incorporated in an EMU ensure that even a malicious adversary may not circumvent an ECL.

In today's Internet-enabled work environment, it is essential that security administrators have full control over the programs that are executed by their user community. The EMU's ability to control which programs are allowed to execute is a significant step toward maintaining a secure networked environment.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A method for preventing process creation of an unauthorized user application executable by an operating system of a computer, comprising:

creating a first device driver;

loading the first device driver into a kernel of the operating system, wherein the first device driver installs a first process creation wrapper function;

modifying an operating system table consulted by a dispatcher using the first device driver, wherein the modifying an operating system table causes the dispatcher to call the first process creation wrapper function before a process creation function and wherein the first process creation wrapper function and one or more subsequent process creation wrapper functions installed by one or more subsequent device drivers are modifiable so that the one or more subsequent process creation wrapper functions are added and removed serially between the first process creation wrapper function and the process creation function and the one or more subsequent process creation wrapper functions are called by the dispatcher before the process creation function;

intercepting a request for execution of an application executable by a user using the first process creation wrapper function;

communicating information about the request from the first process creation wrapper function to a user-mode application running as a service on the operating system, wherein the communicating information about the request from the first process creation wrapper function to a user-mode application occurs within the operating system;

comparing the information to a list of authorized executables for the user using the user-mode application;

if the information does not match an item on the list, communicating a first message to deny the request from the user-mode application to the first process creation wrapper function; and if the information does match an item on the list, communicating a second message to permit the request from the user-mode application to the first process creation wrapper function.

2. The method of claim 1, wherein the loading the first device driver comprises one of dynamically loading into the kernel and loading into the kernel as part of a boot sequence.

3. The method of claim 1, wherein the process creation function provided by the operating system comprises ZwCreateProcess.

4. The method of claim 1, wherein the information comprises one or more of a user name, an application executable name, and a cryptographic identifier of an application executable.

5. The method of claim 4, wherein the cryptographic identifier of an application executable comprises a hash created using an MD5 cryptographic algorithm.

6. The method of claim 1, wherein the list comprises one or more of an application executable name and a cryptographic identifier of an application executable.

7. The method of claim 1, wherein the comparing the information to a list comprises comparing an application executable name of the information with an application executable name of at least one item from the list.

8. The method of claim 1, wherein the comparing the information to a list comprises comparing a cryptographic identifier of the information with a cryptographic identifier of at least one item from the list.

9. The method of claim 1, wherein the communicating information about the request comprises one or more of releasing a semaphore, calling an application program interface function, polling, using a socket, and using a pipe.

10. The method of claim 1, wherein the communicating a first message to deny the request comprises one or more of calling an application program interface function, polling, using a socket, and using a pipe.

11. The method of claim 1, wherein the communicating a second message to permit the request comprises one or more of calling an application program interface function, polling, using a socket, and using a pipe.

12. A method for preventing process creation of an unauthorized user application executable by an operating system of a computer, comprising:
creating a first device driver;
loading the first device driver into a kernel of the operating system, wherein the first device driver installs a first process creation wrapper function;
modifying an operating system table consulted by a dispatcher using the first device driver, wherein the modifying an operating system table causes the dispatcher to call the first process creation wrapper function before a process creation function and wherein the first process creation wrapper function and one or more subsequent process creation wrapper functions installed by one or more subsequent device drivers are modifiable so that the one or more subsequent process creation wrapper functions are added and removed serially between the first process creation wrapper function and the process creation function and the one or more subsequent process creation wrapper functions are called by the dispatcher before the process creation function;
intercepting a request for execution of an application executable by a user using the first process creation wrapper function;
communicating information about the request from the first process creation wrapper function to a user-mode application running as a service on the operating system, wherein the communicating information about the request from the first process creation wrapper function to a user-mode application occurs within the operating system;
prompting the user for authorization to proceed using the user-mode application;
if the authorization is not provided, communicating a first message to deny the request from the user-mode application to the first process creation wrapper function; and
if the authorization is provided, communicating a second message to permit the request from the user-mode application to the first process creation wrapper function.

13. The method of claim 12, wherein the authorization comprises a password.

14. The method of claim 13, wherein the loading the first device driver comprises one of dynamically loading into the kernel and loading into the kernel as part of a boot sequence.

15. A system for preventing process creation of an unauthorized user application executable by an operating system of a computer, comprising:
a first device driver, wherein the first device driver is loaded into a kernel of the operating system;
a first process creation wrapper function, wherein the first device driver installs the first process creation wrapper function in the kernel of the operating system, wherein the first device driver modifies an operating system table consulted by a dispatcher causing the dispatcher to call the first process creation wrapper function before a process creation function, and wherein the first process creation wrapper function and one or more subsequent process creation wrapper functions installed by one or more subsequent device drivers are modifiable so that the one or more subsequent process creation wrapper functions are added and removed serially between the first process creation wrapper function and the process creation function and the one or more subsequent process creation wrapper functions are called by the dispatcher before the process creation function; and
a user-mode application running as a service on the operating system, wherein the communicating information about the request from the first process creation wrapper function to a user-mode application occurs within the operating system and wherein the a user-mode application receives information about the request from the first process creation wrapper function, compares the information to a list of authorized executables for the user, communicates a first message to deny the request to the first process creation wrapper function, if the information does not match an item on the list, and communicates a second message to permit the request to the first process creation wrapper function, if the information does match an item on the list.

16. The system of claim 15, further comprising an administrative server, wherein the administrative server is in communication with the user-mode application, and wherein the user-mode application downloads the list from the administrative server.

* * * * *